US010813276B2

(12) United States Patent
Heathcote

(10) Patent No.: US 10,813,276 B2
(45) Date of Patent: Oct. 27, 2020

(54) SEED DELIVERY SYSTEM

(71) Applicant: COTE AG TECHNOLOGIES, LLC, West Des Moines, IA (US)

(72) Inventor: Chad Heathcote, West Des Moines, IA (US)

(73) Assignee: COTE AG TECHNOLOGIES, LLC, West Des Moines, IA (US)

( * ) Notice: Subject to any disclaimer, the term of this patent is extended or adjusted under 35 U.S.C. 154(b) by 0 days.

(21) Appl. No.: 15/920,397

(22) Filed: Mar. 13, 2018

(65) Prior Publication Data
US 2018/0263177 A1  Sep. 20, 2018

Related U.S. Application Data

(60) Provisional application No. 62/470,927, filed on Mar. 14, 2017.

(51) Int. Cl.
| | | |
|---|---|---|
| A01C 7/12 | (2006.01) | |
| A01C 7/16 | (2006.01) | |
| A01C 7/20 | (2006.01) | |
| A01C 19/02 | (2006.01) | |

(52) U.S. Cl.
CPC .............. *A01C 7/122* (2013.01); *A01C 7/123* (2013.01); *A01C 7/127* (2013.01); *A01C 7/128* (2013.01); *A01C 7/20* (2013.01); *A01C 19/02* (2013.01); *A01C 7/16* (2013.01); *Y02P 60/214* (2015.11)

(58) Field of Classification Search
CPC ........... A01C 7/046; A01C 7/06; A01C 7/122; A01C 7/123; A01C 7/127; A01C 7/16; A01C 7/20

See application file for complete search history.

(56) References Cited

U.S. PATENT DOCUMENTS

| | | | | |
|---|---|---|---|---|
| 4,388,878 | A | * | 6/1983 | Demzin ................. A01O 5/062 |
| | | | | 111/152 |
| 5,598,794 | A | * | 2/1997 | Harms ................... A01C 7/102 |
| | | | | 111/177 |
| 5,640,915 | A | | 6/1997 | Schaffert |
| 2002/0100401 | A1 | | 8/2002 | Lempriere |
| 2007/0034721 | A1 | | 2/2007 | Owenby et al. |
| 2015/0223392 | A1 | * | 8/2015 | Wilhelmi ................ A01C 7/20 |
| | | | | 111/171 |
| 2016/0100519 | A1 | * | 4/2016 | Noer ..................... A01C 7/081 |
| | | | | 111/170 |
| 2016/0106025 | A1 | * | 4/2016 | Nelson ................... A01O 5/064 |
| | | | | 111/121 |
| 2016/0143213 | A1 | * | 5/2016 | Kowalchuk ........... A01C 7/127 |
| | | | | 111/170 |
| 2016/0212932 | A1 | * | 7/2016 | Radtke .................. A01C 7/046 |

OTHER PUBLICATIONS

International Searching Authority, United States, Notification of Transmittal of the International Search Report and the Written Opinion of the International Searching Authority, May 25, 2018, 9 pages, International Appl. No. PCT/US2018/22360.

\* cited by examiner

*Primary Examiner* — Alicia Torres
(74) *Attorney, Agent, or Firm* — Zarley Law Firm, P.L.C.

(57) ABSTRACT

A seed delivery system having a housing with an input opening at a first end and a discharge opening at a second end. The input opening is adjacent a seed meter and is adapted to receive and transport seeds from the seed meter to a first of a plurality of seed transport rollers disposed within the housing.

7 Claims, 10 Drawing Sheets

SEED DELIVERY SYSTEM

CROSS REFERENCE TO RELATED APPLICATION

This application claims the benefit of U.S. Provisional Application No. 62/470,927 filed Mar. 14, 2017.

BACKGROUND OF THE INVENTION

This invention is directed to a seed delivery system. Seed delivery systems are known in the art. While useful, current delivery systems do not adequately prevent seed bounce and rollout at high speeds, are not capable of planting all varieties, shapes, and sizes of row crop and small grain drill crop seeds, or are capable of being retrofit to existing planter row units. Also, existing seed delivery systems lack an effective integrated in-furrow nutrient delivery system that operates simultaneously while planting. The ability to plant seed at a high speed while maintaining accuracy of seed spacing is of value as it reduces time in the field, reduces cost through a reduction in seed waste, and leads to higher yields. The ability of using a seed delivery system that is capable of planting all varieties, shapes, and sizes of row crop and small grain seed crops is of value because it saves time and eliminates the inconvenience of removing and replacing seed delivery systems used with a specific type of seed. Also, an integrated in-furrow nutrient delivery system not only reduces the number of passes through a field, but also improves the manner in which the nutrients are applied. Accordingly, a need exists in the art for a system that addresses these deficiencies.

An objective of the present invention is to provide a seed delivery system that accurately delivers to a furrow at a high speed.

Another objective of the present invention is to provide a seed delivery system that is capable of delivering seeds of all varieties, shapes, and sizes.

A still further objective of the present invention is to provide a seed delivery system having a nutrient delivery system that operates simultaneously.

These and other objectives will be apparent to those skilled in the art based upon the following written description, drawings, and claims.

SUMMARY OF THE INVENTION

A seed delivery system where, in one example the system has a housing with an inlet opening and a discharge opening. Disposed within the housing are a plurality of seed transport rollers that transport seed received at the inlet opening to a furrow at the discharge opening. Preferably the seed transport rollers, driven by a motor and gear assembly, have pockets for receiving a seed that are separated by transition teeth. The transition teeth are received within slots on an adjacent roller and intersect the roller at a hand off section.

The housing has a delivery section with a first conduit for delivering granular seed and nutrients to a furrow and a second conduit for delivering liquid nutrients to a furrow at low pressure. The housing also has an inner wall that runs along an outer perimeter of the seed transport rollers to form a delivery path. The inner wall, along the delivery path, has a plurality of elongated fins having a height that is reduced from the outer fins to the inner fins to assist in centering the seed within the delivery path.

DETAILED DESCRIPTION

Figure 1:
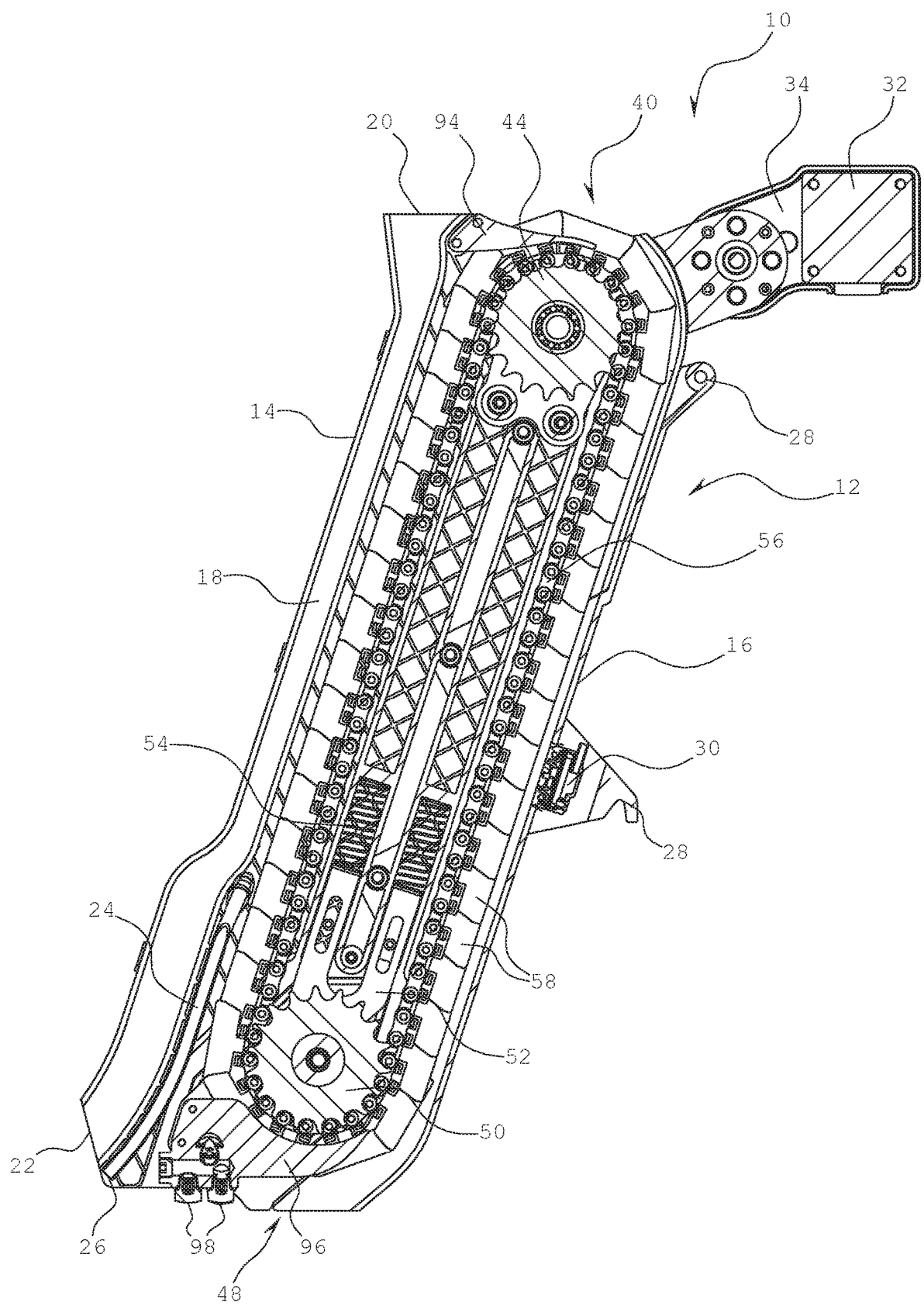
FIG. 1 is a side sectional view of a seed delivery system.
Figure 2:
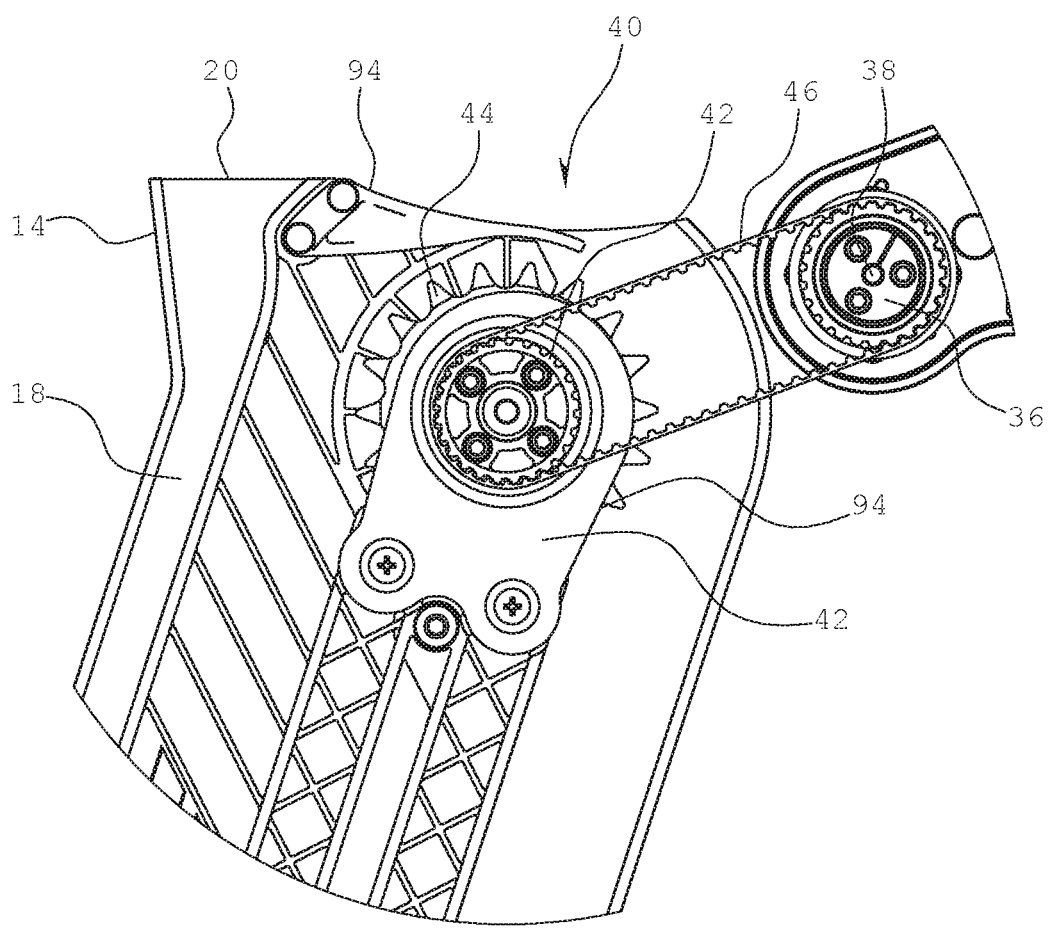
FIG. 2 is a partial side sectional view of a seed delivery system.
Figure 3:
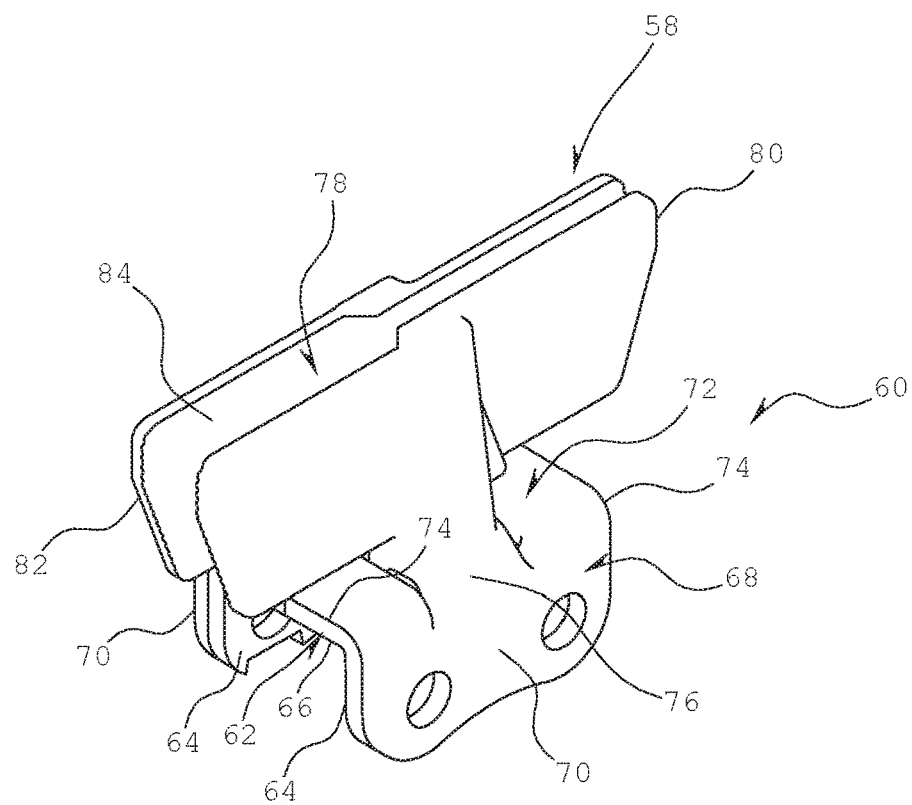
FIG. 3 is a perspective view of a seed retaining member.
Figure 4:
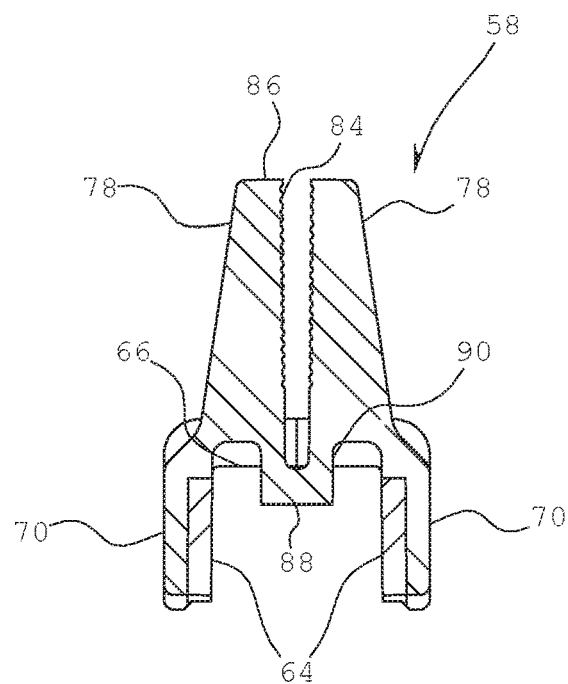
FIG. 4 is a an end view of a seed retaining member.
Figure 5:
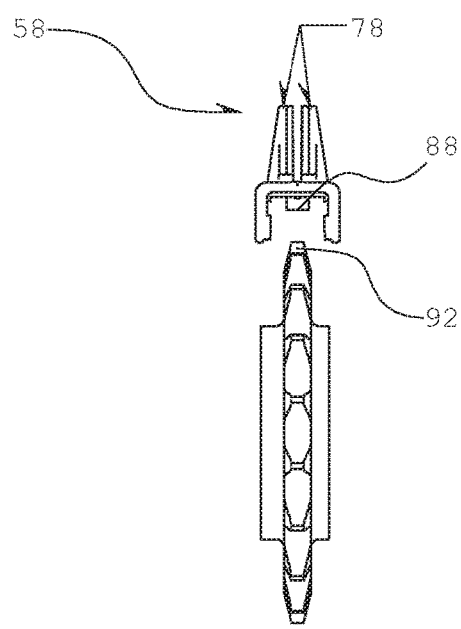
FIG. 5 is an end view of a seed retaining member and a drive pulley.
Figure 7:
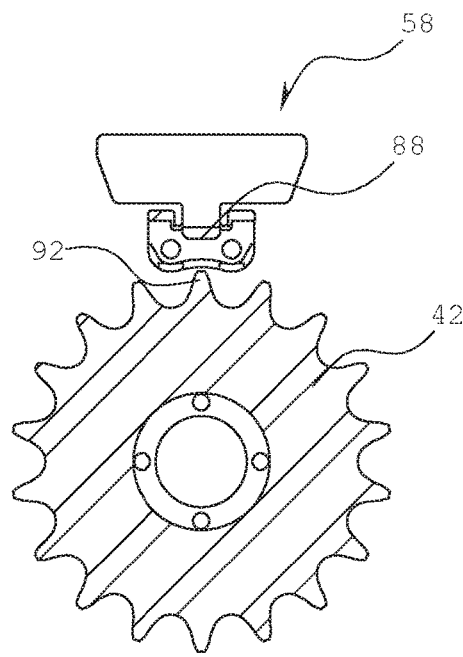
FIG. 7 is a side view of a seed retaining member and a drive pulley.
Figure 6:
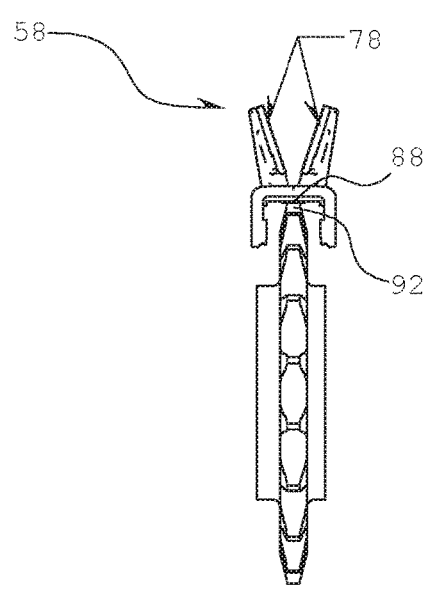
FIG. 6 is an end view of a seed retaining member and a drive pulley.
Figure 8:
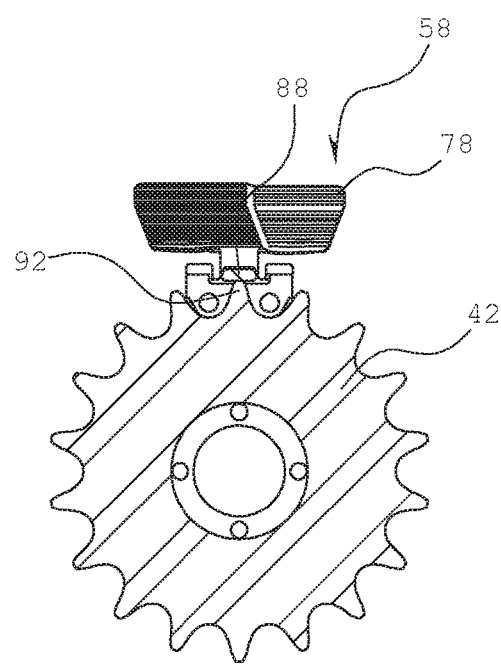
FIG. 8 is a perspective view of a seed retaining member with a side view of a drive pulley.
Figure 9:
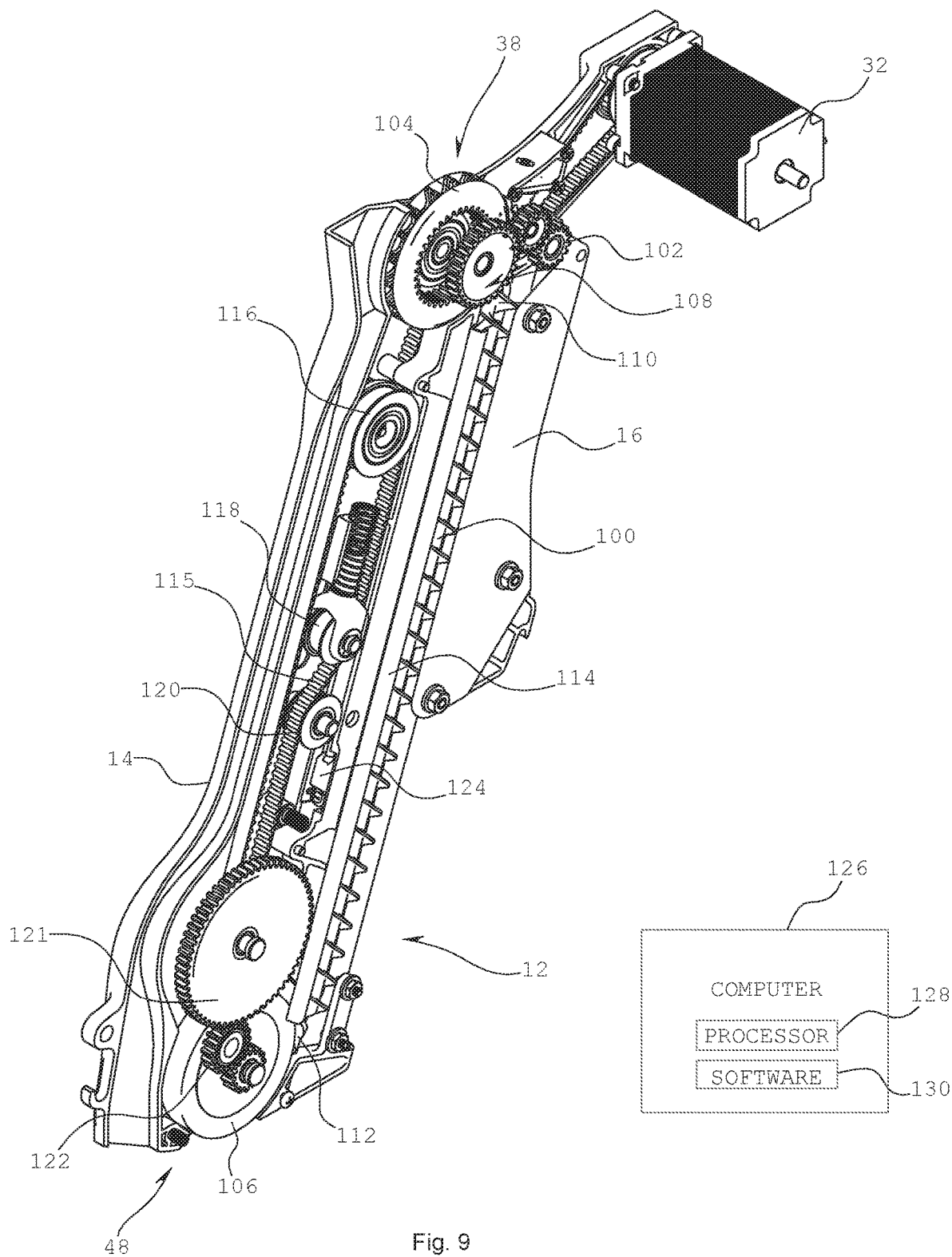
FIG. 9 is a perspective sectional view of a seed delivery system.
Figure 10:
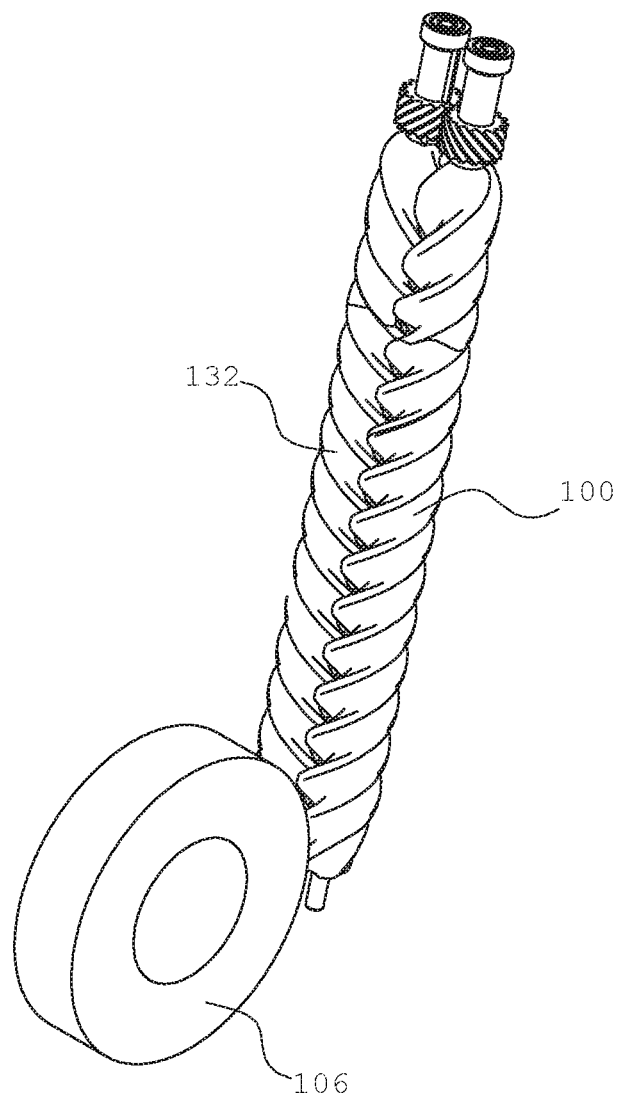
FIG. 10 is a perspective view of a partial seed delivery system.
Figure 11:
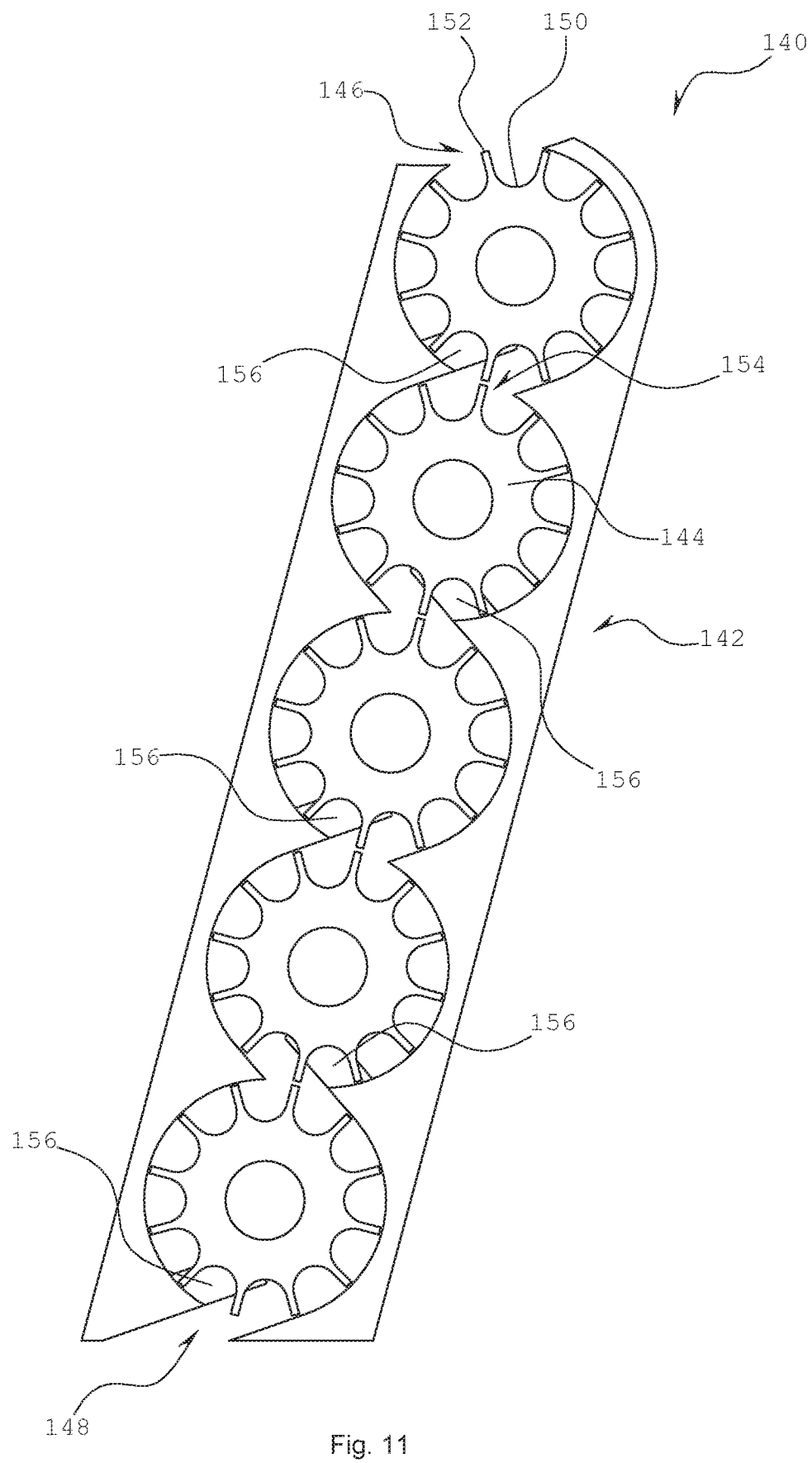
FIG. 11 is a side view of a seed delivery system.
Figure 12:
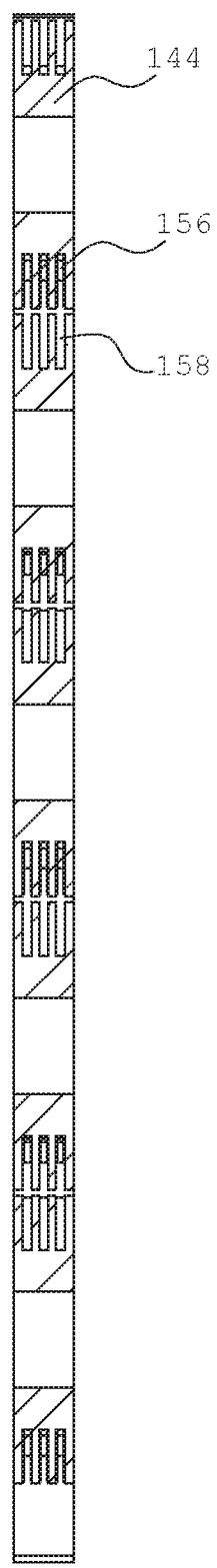
FIG. 12 is an end sectional view of a seed delivery system.
Figure 13:
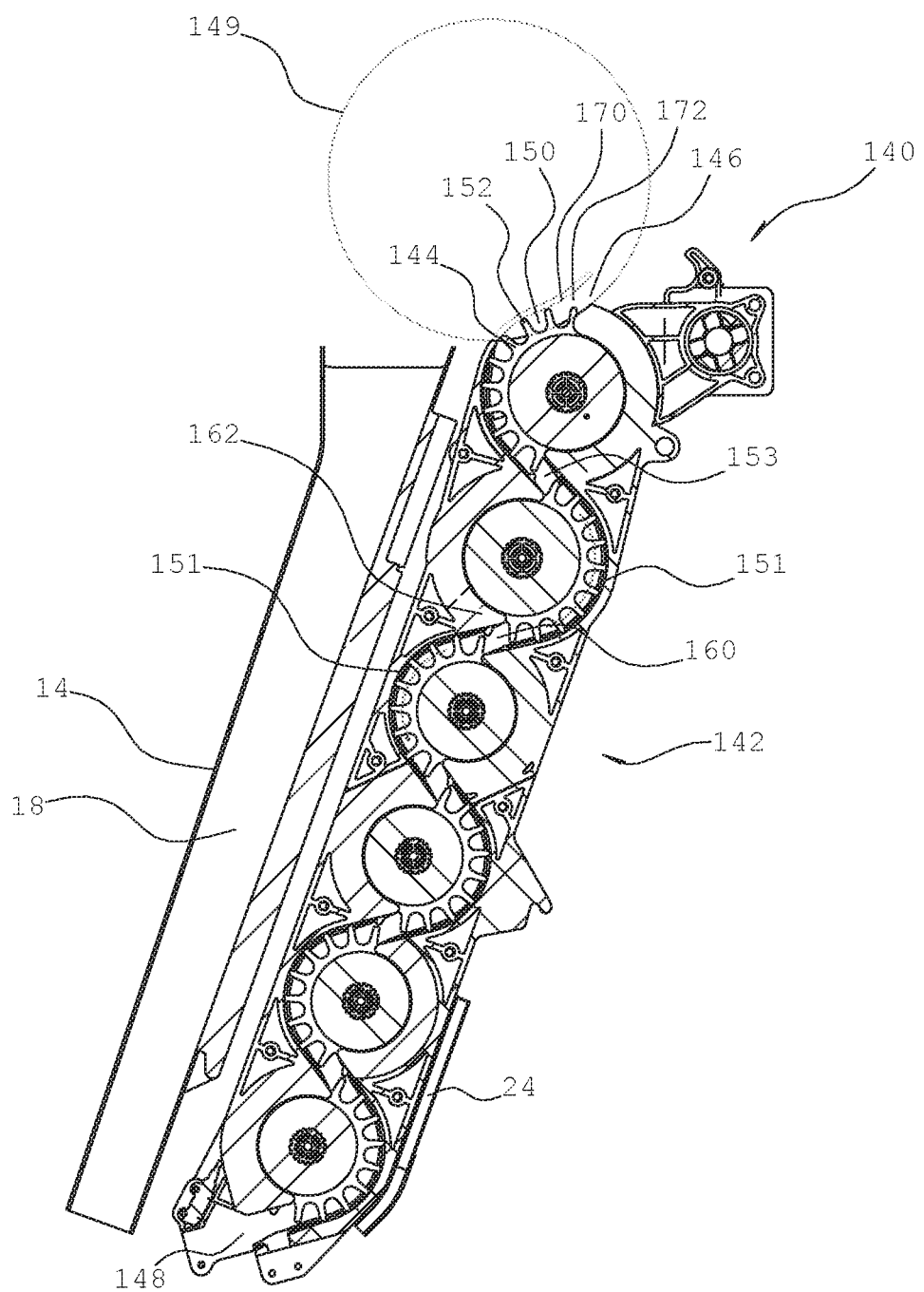
FIG. 13 is a side sectional view of a seed delivery system.
Figure 14:
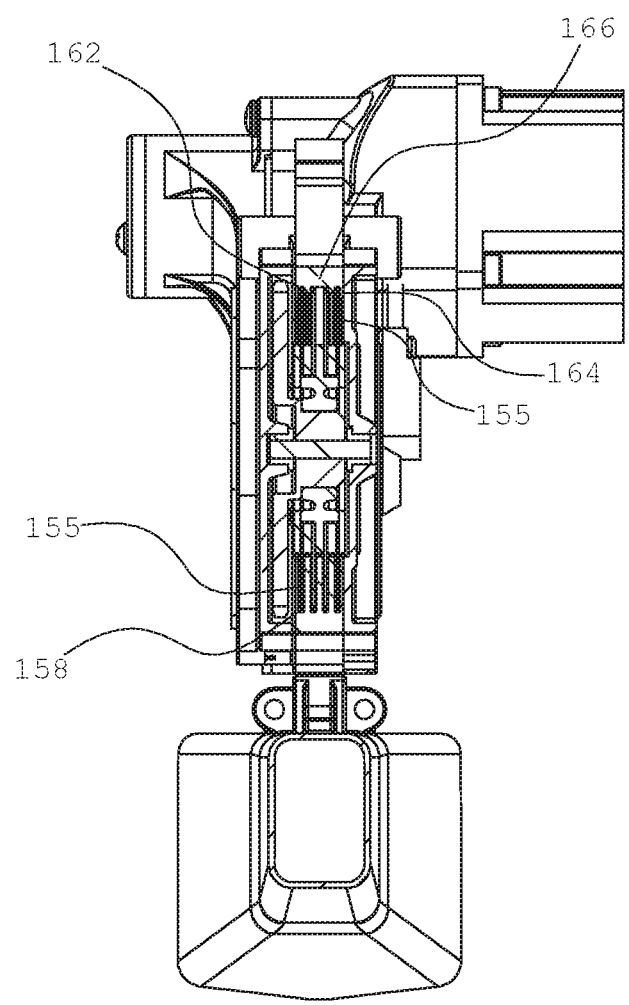
FIG. 14 is an end sectional view of a seed delivery system.

Referring to the Figures, a seed delivery system 10 includes a housing 12 having an integrated delivery section 14 and a removably connected mounting section 16 connected to one another. The delivery section 14 has a first conduit 18 that extends from a first or input end 20 to a second or discharge end 22. The first conduit 18 is used to deliver small grain seed or granular pesticide, fungicide, and insecticide from a meter with a scoop plate (not shown) or a modular system to a furrow. The delivery section 14 also has a second conduit 24 having a discharge end 26 adjacent a furrow that delivers low pressure liquid fertilizer from a fertilizer tank (not shown) to a furrow. The mounting section 16 has a pair of outwardly extending mounting flanges 28 that are used to connect the seed delivery system 10 to any type of planter row unit. The seed delivery system 10 has a sensor 30 disposed within to sense the position of a seed as it travels through the delivery system.

Connected to the housing 12 is a motor 32. In one example, the motor 32 is a stepper motor connected to a gearbox 34 having a pulley 36 mounted to a drive shaft 38.

Disposed within the housing 12, adjacent an inlet port or opening 40 is a driven pulley 42 having an attached sprocket 44. A continuous belt 46 is mounted about pulley 38 and 42.

Adjacent a discharge port or opening 48 is a lower sprocket 50 mounted to a tensioning bracket 52. At one end of tensioning bracket 52 is one or more springs 54. The springs 54 permit bracket 52 and sprocket 50 to be compressed in the direction of sprocket 44 in order to maintain tension on the continuous chain 56.

Connected to the chain 56 are a plurality of seed retaining members 58. The seed retaining members 58 are of any size, shape, and structure. In one example, the seed retaining member 58 has a resilient plastic portion 60 connected to a metal bracket 62. The metal bracket 62 is u-shaped having a pair of side walls 64 in spaced parallel relation that terminate in a top wall 66. The resilient portion 60 also has a bracket section 68 with sidewalls 70 that engage the side walls 64 of the metal bracket 62. The bracket section 68 also has a top section 72 that connects side walls 70 at ends 74 of the top section 72.

Between the ends 74 of the top section 72 is a center portion 76. Extending upwardly and inwardly at an angle from the sidewalls 70, the center portion 76 has a pair of wings or clips 78. The clips 78 which are in spaced relation to one another, have a first end 80 and a second end 82. The space between the clips 78 at the second end 82 is greater than the width at the first end to allow the first end 80 of the adjacent retaining member 58 to fit within when aligned on the chain 56.

A central portion of an inner or engaging surface 84 of the clips 78 extends from a top edge 86 to a bottom wall 88 that connects the clips 78 together. The bottom wall 88 dwells below the ends 74 of the top section 72 of bracket 68 and extends through an opening 90 in the top wall 66 of metal bracket 62. The bottom wall 88 is positioned to selectively engage teeth 92 on sprockets 42 and 50.

When a tooth 92 on either sprocket 42 or 50 engages the bottom wall 88 of the resilient portion 60, the bottom wall 88 is forced toward the top edge 86. Because side walls 70 are connected to chain 56, the force placed against bottom wall 88 causes the clips 78 to move apart to either receive or release a seed.

To assist in opening or separating the clips 78 at the inlet port 38 is a receiver cam 94 mounted adjacent the upper sprocket 42. As the clips rotate about the upper sprocket 42, receiver cam 94 ensures that the seed retaining members 58 are fully opened and prevent seed from falling through the clips 78 and into the continuous chain 56. To further assist the seed retaining members 58 in properly securing the seed, two chain cams 42 are positioned adjacent to one another on opposite sides of the upper sprocket 42. The continuous chain 56 rides along the outer edge 94 of the chain cam 42 causing the retaining members 58 to gradually disengage the sprocket teeth 92 from the bottom wall 88 of the retaining members 58, therefore allowing the clips 78 to move back toward one another and gripping onto the seed between them.

Mounted to the tensioning bracket 52 and adjacent to the discharge port 48 is an ejector cam 96. Like the receiver cam member 92, the ejector cam 96 is positioned and formed to be received between and hold the clips 78 in a separated position to force the seed to drop into a furrow.

In one example, connected to the ejector cam 96 is at least one and preferably more high pressure nozzles 98. The nozzles 98, which are connected to a nutrient source, are positioned to inject fertilizer into the soil at high pressure.

In another embodiment, disposed within the housing 12 is a helical auger 100, a gear assembly 102, a receiver wheel 104 and an ejector wheel 106. The receiver wheel 104 is positioned at the inlet port 38 and is driven, through a gear reduction assembly 108, by motor 30 to match the rotation of a seed meter (not shown). The receiver wheel 104 is positioned to transport seed from the seed meter to an inlet end 110 of auger 100. Extending adjacent the auger 100 from the inlet end 110 to a discharge end 112 is a conformable wall or partition 114 that assists in transporting seed along the auger 100.

The ejector wheel 106 is positioned adjacent the discharge port 48 of the housing 12 and the discharge end 112 of the auger 100. The ejector wheel 106 is positioned to transport seed from the auger 100 to the furrow. The ejector wheel 106 may be driven by a second motor (not shown) or as shown, a gear assembly 121. The gear assembly 121 is of any type and in one example is driven by a timing belt 115, an offset pulley 116, a tension pulley 118, and an idler pulley 120. A second gear reduction assembly 122 is associated with the gear assembly 121 to drive the ejector wheel 106. Preferably the ejector wheel 106 is driven to rotate at an accelerated rate compared to ground speed in order to closely match the seed velocity at egress to that of the ground.

A sensor 124 is positioned within the housing 12 to detect the position of seed within the delivery system 10 Using software 130, the processor determines a desired rotational speed for the auger 100, and the ejector wheel 106 and sends a signal to the motors so that the parts of the delivery system work together.

In yet another embodiment, the gear assembly 102, receiver wheel 104 and conformable wall 114 are removed and replaced with a second auger 132. The second auger 132 is positioned adjacent the first auger 100 such that the flighting on the second auger 132 is reversed in relation to and intersects with flighting on the first auger 100. The augers 100 and 132 rotate in opposite directions to provide a path of transport for a seed from the seed meter to an ejector wheel 106 or directly into the furrow.

In yet another embodiment, a seed delivery system 140 has a housing 142 and a plurality of seed transport rollers 144 disposed within the housing 142. The housing 142 has an opening at a seed receiving end 146 and another opening at a seed exit 148. The seed receiving end 146 is positioned adjacent a seed meter 149 (not shown) and adapted to receive and/or transport a seed from the seed meter 149 to the seed delivery system 140. The seed exit 148 is positioned adjacent a furrow and adapted to discharge a seed into the furrow with little or no bounce or roll.

The housing 142 has an inner wall 151 that is formed to fit around an outer periphery of the seed transport rollers 144 leaving little or no space between the two, yet still permitting the seed transport rollers 144 to rotate within the inner wall 151. The seed transport rollers 144 are of any size, shape, and structure and in one example, the rollers 144 have a plurality of pockets 150 formed along a peripheral edge of the rollers 144 in which a seed will travel, with each pocket 150 separated by a tooth 152. The seed transport rollers 144 are indexed, geared, and timed to one another so that during rotation the teeth 152 on adjacent rollers 144 align. The alignment of the teeth permit a seed to be transferred form one roller 144 to another in a hand off section 153 between rollers 144.

In another example, the seed transport rollers 144 are formed by a plurality of resilient disks spaced 155 apart from one other to form slots. The teeth 152 on roller 144 are offset from the teeth 152 of an adjacent roller so that the teeth are received within slots 158 and from a side view the teeth 152 of adjacent rollers 144 intersect.

Adjacent seed transport rollers 144 are adapted to rotate in opposite directions to create a serpentine delivery path 160 along the inner wall 151 of the housing 142. The inner wall 151 of the housing 142, along the delivery path 160, has a plurality of elongated fins 162. The height of the fins 162 along the length of the inner wall 151 decrease from an outer edge 164 of the inner wall 151 toward a center 166 of the inner wall 151. The gradual decrease in height of the fins 162 assist in centering a seed along the delivery path 160. Because the seed is centered and not bouncing back and forth in part due to centrifugal force, greater accuracy in plant spacing is achieved. Also, to assist in removing the seed delivery system 14 has a handoff section having combs 156 that are positioned between adjacent seed transport rollers 144 where the seeds move from one seed transport roller 144 to the next seed transport roller. The length of the combs 156 may be shorter on the outer edge of the seed transport rollers 144 and be greater as the combs 156 are closer to the center of the seed transport roller 144.

The housing 142 has a delivery section 14 with a first conduit 18 for delivering granular material to a furrow and a second conduit 24 for delivering low pressure liquid fertilizer to a furrow. Preferably, the discharge for liquid fertilizer conduit is forward of the seed discharge so that nutrients are added to the furrow prior to the seed so that the nutrients are not poured on top of the seeds.

To further improve the accuracy of the spacing of seeds delivered to the furrow, the seed delivery system 14 has a variable speed component. In particular, the variable speed component has two modes of operation. The first mode drives the delivery system 140 at a speed exceeding the forward ground speed of the delivery system to allow the seed to breach the surface of the soil in the seed trench to reduce or eliminate seed roll or bounce. The second mode drives the delivery system at a speed slightly slower than the ground speed of the delivery system 140.

In one example, a ground speed sensor, such as GPS system or the like, sends a signal to a controller 126. The controller processes the signal to determine the ground speed and then sends a signal to the motor to adjust the speed of the seed delivery system based upon a predetermined margin or difference.

Accordingly, several seed delivery systems have been disclosed that, at the very least, meet all the stated objectives.

What is claimed is:

1. A seed delivery system, comprising:
   a housing having a seed receiving end and a seed exit end;
   a plurality of seed transport rollers disposed within the housing, wherein the plurality of seed transport rollers have a plurality of seed pockets; and
   a variable speed component configured to drive the seed delivery system at a first speed exceeding the forward ground speed of the seed delivery system such that a seed breaches a surface of a soil in a seed trench and a second speed slower than the speed of the seed delivery system;
   wherein the housing has an inner wall adjacent a delivery path having a plurality of elongated fins adapted to center a seed in relation to the inner wall;
   wherein a height of the elongated fins along a length of the inner wall decrease from an outer edge of the inner wall toward a center of the inner wall.

2. The seed delivery system of claim 1 wherein the plurality of seed pockets are separated by teeth.

3. The seed delivery system of claim 1 wherein the adjacent seed transport rollers rotate in opposite directions to form a seed delivery path.

4. The seed delivery system of claim 2 wherein the plurality of seed transport rollers are geared and timed to one another and the teeth on one seed transport roller are aligned with the teeth on the next seed transport roller.

5. The seed delivery system of claim 1 wherein the housing has a delivery section having a first conduit for delivering granular material to a furrow and a second conduit for delivering low pressure liquid fertilizer to a furrow.

6. A seed delivery system, comprising:
   a housing having a seed receiving end and a seed exit end; and
   a plurality of seed transport rollers disposed within the housing, wherein the plurality of seed transport rollers have a plurality of seed pockets;
   wherein the housing has an inner wall adjacent a delivery path having a plurality of elongated fins along the delivery path adapted to center a seed in relation to the inner wall;
   wherein a height of the elongated fins along a length of the inner wall decrease from an outer edge of the inner wall toward a center of the inner wall.

7. The system of claim 5 wherein the second conduit is forward of the seed exit end of the housing.

* * * * *